United States Patent [19]

King et al.

[11] Patent Number: 4,974,358
[45] Date of Patent: Dec. 4, 1990

[54] CYCLE CONTROL FOR ELECTRIC DOWNRIGGERS

[75] Inventors: Jack C. King, North Muskegon; Eugene D. Pease, Muskegon Heights, both of Mich.

[73] Assignee: S & K Products, Muskegon, Mich.

[21] Appl. No.: 759,688

[22] Filed: Jul. 29, 1985

[51] Int. Cl.$^5$ ............................................. A01K 89/17
[52] U.S. Cl. ...................................................... 43/26.1
[58] Field of Search .................... 43/15, 21, 26.1; 318/285

[56] References Cited

U.S. PATENT DOCUMENTS

| | | | |
|---|---|---|---|
| 3,365,833 | 1/1968 | Christiansen | 43/15 |
| 3,522,502 | 8/1970 | Tuchen | 318/285 |
| 4,204,356 | 5/1980 | Smith | 43/26.1 |
| 4,253,165 | 2/1981 | Christiansen | 43/26.1 |
| 4,339,811 | 7/1982 | Bednarz et al. | 367/96 |
| 4,376,350 | 3/1983 | Bednarz et al. | 43/26.1 |
| 4,378,652 | 4/1983 | Lindgren | 43/26.1 |
| 4,384,427 | 5/1983 | Christiansen | 43/26.1 |
| 4,418,491 | 12/1983 | Christiansen | 43/26.1 |
| 4,463,242 | 7/1984 | Engelmann | 318/285 |

Primary Examiner—Kurt Rowan
Attorney, Agent, or Firm—Miller, Morriss & Pappas

[57] ABSTRACT

An electronic cycle control for electric downriggers providing the fisherman with a selection of amplitude for up and down motion at fishing depth for the ball or weight and offering a selection of dwell at each extreme of movement and functioning automatically and repetitively until terminated by the fisherman. The electronic control unit operates as a piggyback operator on the reversing relays of the electric motor of the downrigger.

3 Claims, 2 Drawing Sheets

CYCLE CONTROL FOR ELECTRIC DOWNRIGGERS

The present invention relates to electric downriggers and more particularly to a structure for cyclic control of a jiggling nature which permits the downrigger to repeatedly raise and lower the downrigger weight or cannonball through a selected distance over a timed interval selected by the fisherman or operator and which functions automatically or manually to cause the motor to reverse itself repetitively in accord with a selected repeated performance.

In general, downriggers are the devices used in trolling and fishing to control and carry the fishing lure to a selected depth and to hold it in the vicinity of that selected depth until a fish strikes the lure trailed behind the weight or cannonball. Upon a strike occurring, the lure line is separated from the weight and the fish is played on normal tackle. This arrangement has made it very difficult to vary the elevation of the lure by jigging because of its trailing connection to the weight. The present invention teaches a means of bobbing or jigging the weight at a set depth through a regular cycle (distance or amplitude and time frequency or dwell) based on a new control selected by the fisherman and functioning repeatedly until automatically shut off or disconnected manually. This materially extends the function of the downrigger to a participation in the fishing independent of merely lowering or raising the weight.

Accordingly, the principal object of the present invention is to repeatedly raise and lower the weight or cannonball through a preselected distance and through a preselected time or dwell interval to tantalize the fish at fishing depth and to utilize the electrical motor drive of the downrigger as the vehical of control.

Another object of the present invention is to provide a cycling or bobbing control which is selectively operative in control of the weight at fishing depth through access to the downrigger motor and initiated at the fishing depth, thereby raising the weight and dropping the weight repetitively at timed intervals until disengaged by manual or automatic means.

Other objects, including economy of construction, repetitive accuracy in cycling, compatability with existing electrical or electronic downrigger controls, and tamperproof construction, will be increasingly apparent as the description proceeds.

The present invention is particularly advantageous in use with downriggers having the control structure of the U.S. Pat. No. 4,376,350 to John J. Bednarz, et al and entitled Automatic Down Rigger Control System or similar controls and microprocessors where, at any depth of the weight as selected by the fisherman-operator, the repetitive jigging control is interjected manually or automatically and the oscillating movement of the motor continues, as desired by the fisherman-operator until terminated manually or automatically.

Other objects will be appreciated by those skilled in the art as the description proceeds.

GENERAL DESCRIPTION

All downriggers that are electrically energized include control means to rasie and lower a weight by directing electricity to a reversible electrical motor by means of some switch or control. The fishing depth may be gauged electronically or by other means such as stops or counters or cable markings. The cable is connected to a driven drum drivably connected to the downrigger motor. The cable is also connected terminally to the weight and the weight carries down the fishing line so that the lure or bait and hook trail behind the weight or cannonball. The fishing line is tensionally retained at the weight and a strike by a fish which takes the trailed bait strips the line out of the retaining means so that it can be played by conventional tackle, as rod and reel. At such disengagement, the weight is usually lifted upwardly by the downrigger clear of the subsequent action. This upward motion may be initiated by the fisherman-operator manually or by automatic sensing means or both. This allows the baiting of a line, the attachment of line and subsequent fishing, as desired. The present invention imposes a supplemental and remote control to permit the selected raising and lowering of the weight through a selected distance which is repeated at the preselected amplitude or distance of movement and at a preselected frequency or timed period. For example, in lake fishing for coho salmon and lake trout, the average amplitude of movement is about five feet. Five feet up and five feet down through a time period of between five seconds and ninety seconds. This bobbing or jigging action effectively improves the versatility of downriggers and extends the fisherman's bag of tricks in a selectively controlled manner. The lure, obedient in a dampened way to the weight position, oscillates vertically providing a realistic action pattern for the lure. As the weight is moved up and down from a dwell position, the lure initially increases speed beyond the speed of the boat or trolling vehical and fishing results are materially improved.

IN THE DRAWINGS

SPECIFIC DESCRIPTION

Figure 1:
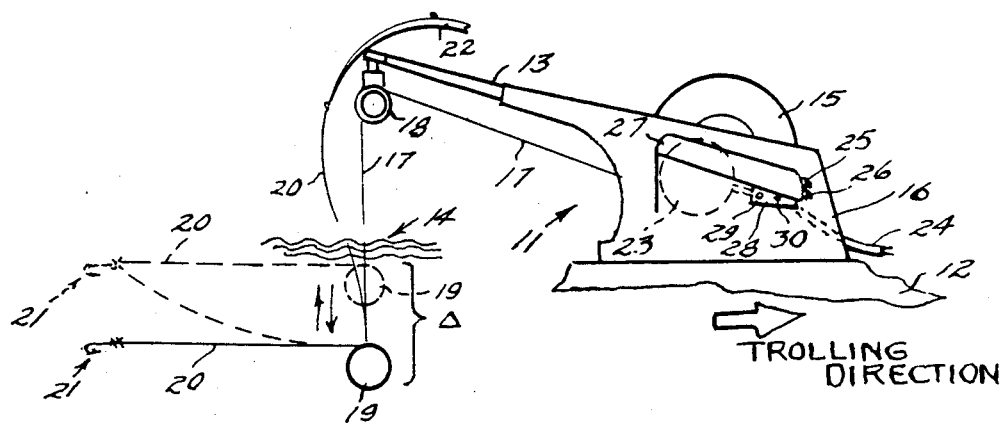
FIG. 1 is a somewhat simplified side elevation view of a typical electrically powered downrigger secured to a boat and with weight and lure lowered into fishing position and indicating the selected oscillation imparted to the weight by the reversing motor and by means of the controls of the present invention.

Referring to the drawing and with first particularity to the FIG. 1 thereof, the typical electrically driven downrigger 11 is shown secured to a boat 12 and the extension arm 13 will be understood as extending over the water 14 (for example, over the transom of a fishing boat). A cable reel 15 is operably mounted in the frame or body 16 of the downrigger 11. The cable spool or reel 15 carries cable 17 secured to the reel and the cable 17 extends over the block 18 suspended pivotally from the extended arm 13. The terminal end of the cable 17 is connected to a weight or cannoball 19 and the weight 19 is dropped into the water 14 and is lowered to a selected fishing depth. A lure line 20 is secured to the weight 19 or cable 17. the lure line 20 extends upward to a connection to fishing tackle such as a fishing rod 22 reel (not shown). When a fish strikes the terminal bait or lure 21, the lure line 20 is freed from its tensioned connection to the weight and the fish can then be played on the light sporting tackle rod 22. Accordingly, the weight 19 carries the lure line 20 down to the fishing level and as trolling proceeds (in the direction of the arrow), the lure or bait 21 follows. The weight or cannonball 19 is raised and lowered by means of the electric motor 23 in the downrigger frame 16 where the motor 23 is operably connected as by gearing to the spool 15. Electrical energy is supplied from a source of direct current energy such as a 12 volt battery which may be a part of the ignition circuit of a conventional engine driving the boat 12. Lead wires 24 enter the frame 16 and provide the power for the motor 23. Switches 25 and 26 provide means to selectively energize the motor to raise and lower the weight 19 by reversing the motor 23 and the connected spool 15. The control panel 27 contains circuitry including relays functioning in accord with the master switches 25 and 26 at a pilot voltage lower than the 12 volt direct current line 24 but closing the higher line voltage to the motor 23. In some downriggers 11, the pilot voltage is manipulated as by a micoprocessor to select a trolling depth and control the precision lifting of the weight and automatic return to operating depth. The auto cycle control 28 of the present invention is superimposed on the operating controls in panel 27 to materially extend the function and utility of the electrical downrigger 11. The automatic cycle control is engageable to control the motor 23 when the weight 19 has achieved fishing depth. The variable selector knobs 29 (time) and 30 (distance revolutions of spool 15) permit the operator to select the time of dwell in the up and down extremes of oscillation and to select the amplitude or distance ($\Delta$) of the repeated lifting and lowering of weight 19. The knob 29 adjusts the dwell and the distance is selected by the knob 30. The function is to provide an action transmitted to the lure 21 which is then at variance with the trolling speed, currents, tides and wave action. This repeated action tantalizes the fish and results in excellent catches. In operation, the selection of distance of weight movement is preferred at about five feet and the selected dwell or time is between about five and ninety seconds. At the selected condition, the weight 19 is automatically cycled repetitively until the cycling is terminated by the fisherman by turning selector knob 29 to zero time.

Figure 2:
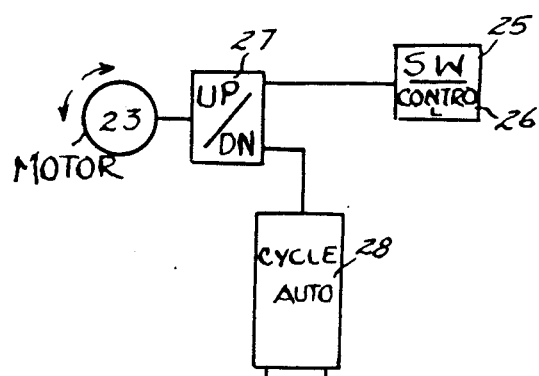
FIG. 2 is a block logic diagram indicating the cycle control for electrical downriggers permitting selection of amplitude of travel in the automatic lifting and lowering of the weight or cannonball operating on the up and down relays and indicating the overriding control or switch for the downrigger motor.

By reference to the FIG. 2, the logic of the cycling control 28 in activation control over the motor 23 at fishing depth is best appreciated. Master controls of switches 25 and 26 exercise selection of movement over the motor 23 to and form a set fishing depth. As previously indicated, this may be by processor or memory function to, say, a fishing strata depth of fifty feet. Then, the fisherman can select a dwell time by manipulating the selector 29 and an amplitude of movement by manipulation of selector knob 30 and the auto cycle control 28 will then assume control over the motor 23 by the oscillation possible through the up/down relays of motor control panel 27. In the simplest of electrical controls, this may be a direct selected repetitve control over the relays. In the microcomputer control systems, the function is still to manipulate the motor control relays at pilot low voltage levels. The motor 23 moves the spool 15, hence the cable 17 and weight 19 and any connected lure.

Figure 3:
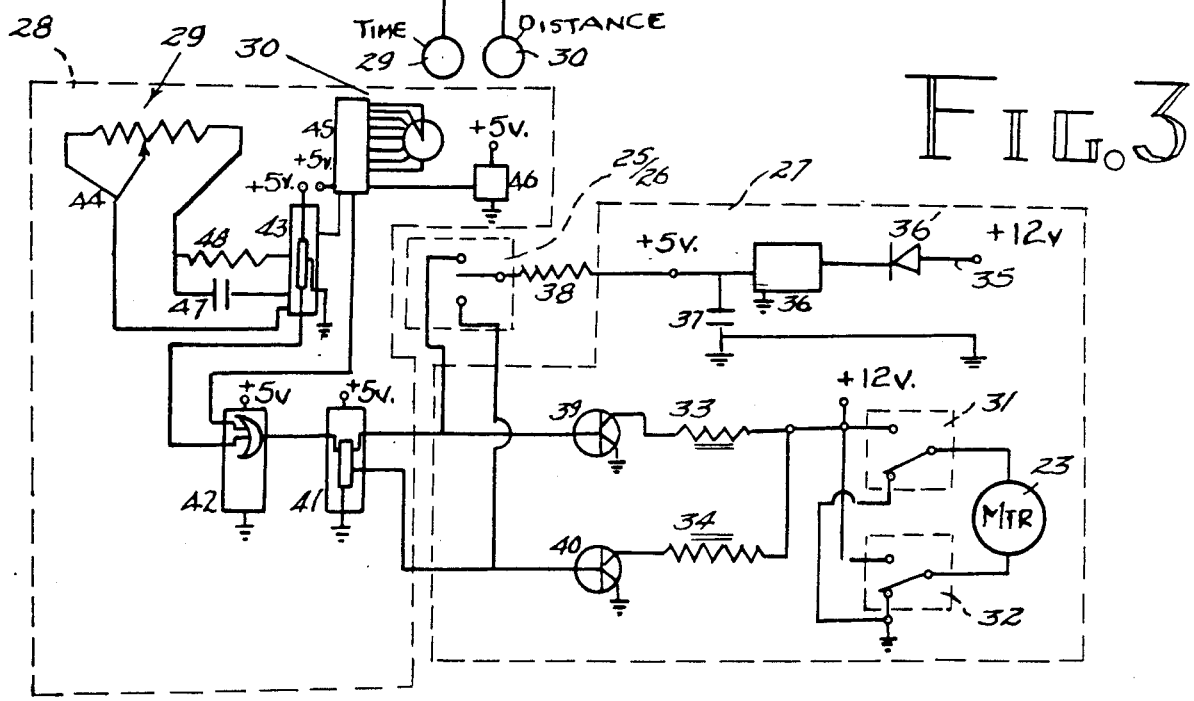
FIG. 3 is a somewhat schematic diagram of the control in accord with the present invention and showing the automatic cycling assembly and related to the overriding downrigger switch and the up/down relay circuits as shifted by the cycling control in selection of dwell time and amplitude or change.
Figure 4:
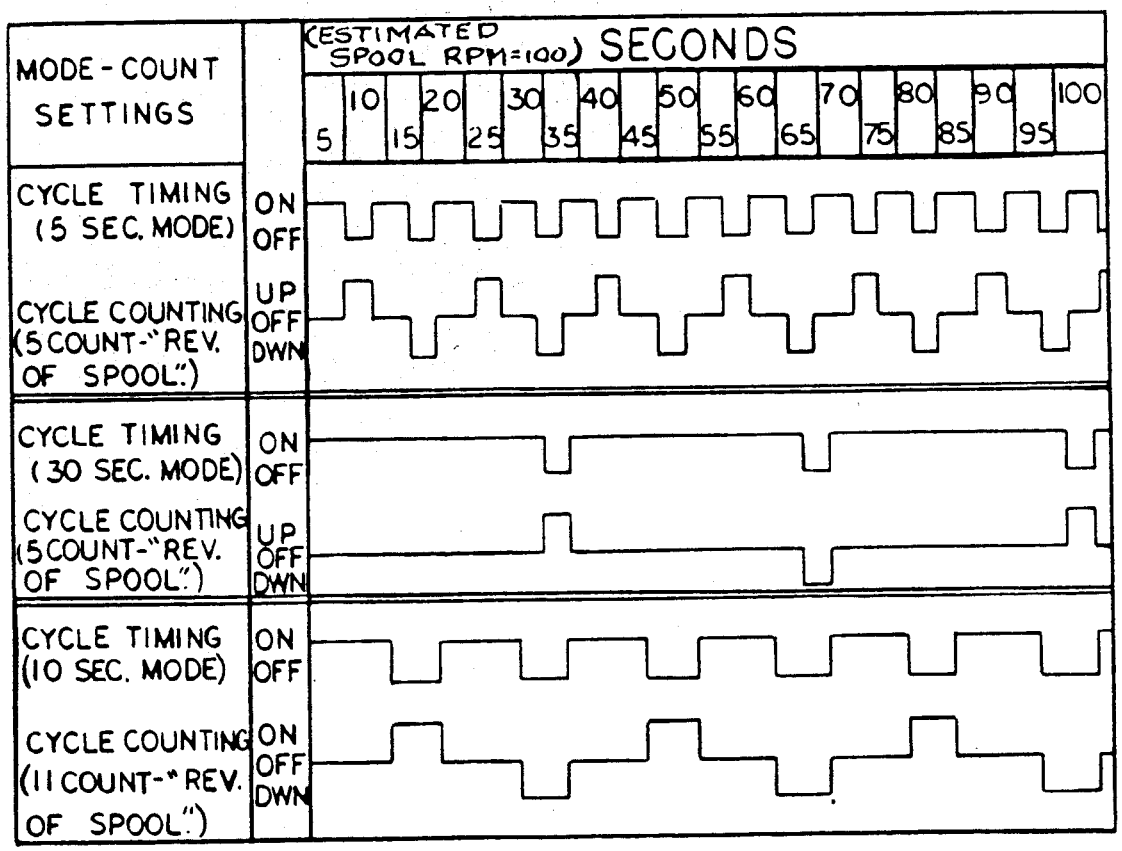
FIG. 4 is a logic state and function table relating the control circuit functions to the downrigger of the present invention based on an estimated spool speed of 100 revolutions per minute and for three typical mode settings. Other selections by cycle timing or cycle counting are selectively available.

The FIG. 3 provides a more detailed appreciation of the preferred form of auto cycle control with selection of amplitude of repeated positions of the weight 19 and with selection of the dwell or time in each extreme of up and down position. The phantom lines define the up/down control 27 governed by the switches 25/26 and acting on relays 31 (up) and 32 (down) via the coils 33 and 34, respectively, at five volts of direct current split from the twelve volt main line 35 by means of 7805 type regulator 36 and protected by the diode 36' (IN 4001). The 0.01 microfarad capacitor 37 provides for interference reduction on the negative side of the main 35. The switches 25/26 are backed by resistance 38 and selectively they close and open the reversing circuit to the high gain transistors 39 and 40, respectively. The main line 25 feeds, through the regulator 36 at power adjusted to 5 volts (as indicated in FIG. 3). Thus, line power at 12 volts, as shown, is reduced to 5 volts to power the auto control circult 28. 28 by connection to the flip-flop 41 and to the gate 42 and thence timer 43 (555 type) and associated selector 44 (dwell) (potentiometer 100K Ohms) and divide by N counter 45 with its associated counting senor 46. The counting sensor is of the magnetic type and senses the revolutions of the spool 15. In the time or dwell selection, as between elements 44 and 43, the selected capacitance 47 (1,000 mfd) and resistance 48 1K Ohm appropriately balanced for function. It will be observed that operating voltage for the auto cycling control 28 and selection 30 is at the pilot five volt level.

The thus described cycling control is wired to a printed circuit board, not shown, which is attachable to the downrigger frame 16 in a compact package having dimensions of about four inches by two inches and depth of one-half inch.

In operation, the described auto control 28 functions aon any electrically powered downrigger 11 to impart a wholly new function for the downrigger 11 and its weight 19 so as to extend the usage of the downrigger to function as a fishing adjunct implementing the attraction and catching of fish by acting through the weight 19 to provide a new and selectively repetitive control over the lure or bait 21.

Having thus described our invention and a specific embodiment thereof, those skilled in the art to which the invention pertains will appreciate improvements, changes and modifications and such improvements, changes and modifications are intended to be included herein limited only by the scope of our hereinafter appended claims.

We claim:

1. An oscillating cycling electronic control acting on up and down motor relays in electrical downriggers to deliver repetitive selected up and down movement to the weight of a downrigger at fishing depth comprising:
   a timer selector;
   a distance selector integrated in an electronic control operative to energize said up and down relays; and
   a motor reversably controlled by said relays, said motor raising and lowering said weight in selected electronic cycling.

2. An electrically powered downrigger and downrigger weight having a reversable motor and electronic controls for said motor through up and down relays, the oscillating movement control comprising:
an automatic cycling electronic revolution counting control having a time selector and distance selector selectively energizable at fishing depth and connected operably to said relays whereby selected time and distance cycling of said motor lifts and lowers said downrigger weight repetitively.

3. A selectively automatic cycling eletronic control for repetitively lifting and lowering a downrigger weight through a selected distance with selected dwell and acting upon the motor and spool through existing switches and relays, the combination including:
a variable electronic timer means;
a variable electronic distance measuring means;
a coordinating electronic circuit means integrating the functions of said timer means related to movement of said spool and said distance means as selected;
solenoids activated by said coordinating circuit to automatically operate said relays in a repetitive cycle in control of said motor in manipulation of said weight at fishing depth.

* * * * *